June 30, 1942.   L. BRYAN   2,287,828
PIPE COATING APPARATUS
Filed May 2, 1940   2 Sheets-Sheet 1

Inventor
LLOYD BRYAN

Inventor
LLOYD BRYAN
by *J. H. Adams*
Attorney

Patented June 30, 1942

2,287,828

UNITED STATES PATENT OFFICE 2,287,828

PIPE COATING APPARATUS

Lloyd Bryan, Los Angeles, Calif., assignor to Standard Oil Company of California, San Francisco, Calif., a corporation of Delaware Application May 2, 1940, Serial No. 332,878

6 Claims. (Cl. 25—38)

This invention relates to pipe coating apparatus which is adapted to apply a relatively thick coating of a dense plastic material, such as a bituminous mastic, to the outer surface of a pipe, and particularly refers to a pump which is incorporated within a readily portable coating apparatus adapted to be moved relatively to a pipeline of considerable length which is temporarily raised above the surface of the earth and is subsequently intended to be buried in a trench.

This invention is an improvement over the apparatus shown in my joint Patent No. 2,186,361 with William R. Postlewaite. The principal advantage of the present invention over the one just mentioned is in its application to large pipes, for example from 12 inches to 18 inches in diameter. The apparatus just identified utilized a mastic pump which was mounted above the annular chamber surrounding the pipe and through which the mastic was extruded to form a seamless coating. For large diameter pipe the dense stiff mastic did not always flow uniformly around the annular space within the coating nozzle so that the coating tended to be thicker on the side nearest the pump than on the opposite side.

This invention overcomes that disadvantage by providing a pump which is mounted within the annular chamber itself and exerts pressure substantially uniformly around the entire periphery of the coating nozzle. The remainder of the apparatus for moving the nozzle along the pipe where the latter is stationary and in place over a trench, or for moving lengths of pipe successively through the nozzle, may be that shown in Patent No. 2,186,361 mentioned above. Generally, it comprises opposed power driven rolls mounted on swinging arms on opposite sides of the pipe, these arms being urged together by means of springs so that the rolls will pass over couplers and the like which may be used to join successive lengths of the pipe being coated.

It is an object of this invention to provide a device for applying a coating to pipe or similar cylindrical objects in which a continuous dense coating of mastic is formed on the pipe without joints, voids, irregularities in thickness or other defects which would interfere with the protective nature of the coating.

Another object is to provide an apparatus which will travel along a continuous length of pipe, for example several miles at a time, without leaving spaces or joints which require subsequent coating or patching.

Another object of the invention is to provide an apparatus for applying a mastic coating which is self-centering and which has a minimum length of longitudinal contact with the pipe, so that when it is used to apply a coating to sharply bent or crooked pipe, the coating will be uniform in thickness around the circumference of the pipe.

Another object of the invention is to provide a device for applying a relatively thick coating of dense mastic in which this material is effectively compressed uniformly around the periphery of the pipe and is further compacted by being drawn through a tapered encircling die.

Another object is to provide an improved means for pumping a plastic bituminous mastic which is substantially solid at temperatures below 200° F. and becomes only slightly plastic or pasty at temperatures of approximately 400° F., one form of the mastic comprising a graded mineral aggregate of substantially maximum density and containing from about 8 to 15 per cent of bituminous material as a binder.

Another object is to provide an improved pump for a mastic coating device for use on pipe sizes ranging upwardly from 12 inches in diameter.

Another object is to provide a pump of this nature which is positively spaced from the pipe so that it will not interfere with or damage a priming coat which may be already in place on the pipe.

Another object is to provide an improved type of pump chamber which will direct the mastic substantially longitudinally with respect to the pipe and into the tapered encircling die which limits the coating thickness.

These and other objects and advantages will be more fully apparent from the following description and from the drawings, which form a part of this specification and illustrate a preferred embodiment of the invention as applied to a pipe coating nozzle.

In the drawings, Figure 1 is a plan view of the device in place upon a pipe which is to be coated.

Figure 1:
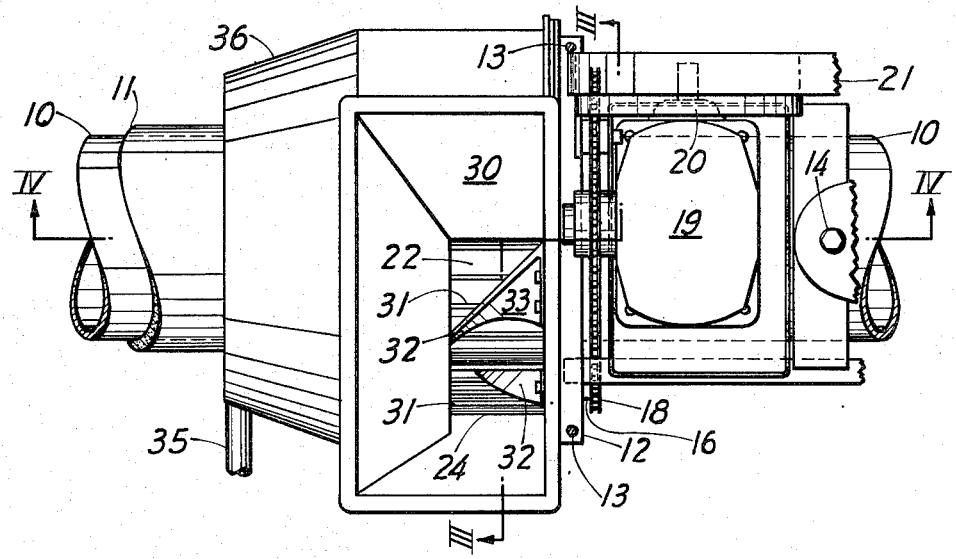
Figure 2:
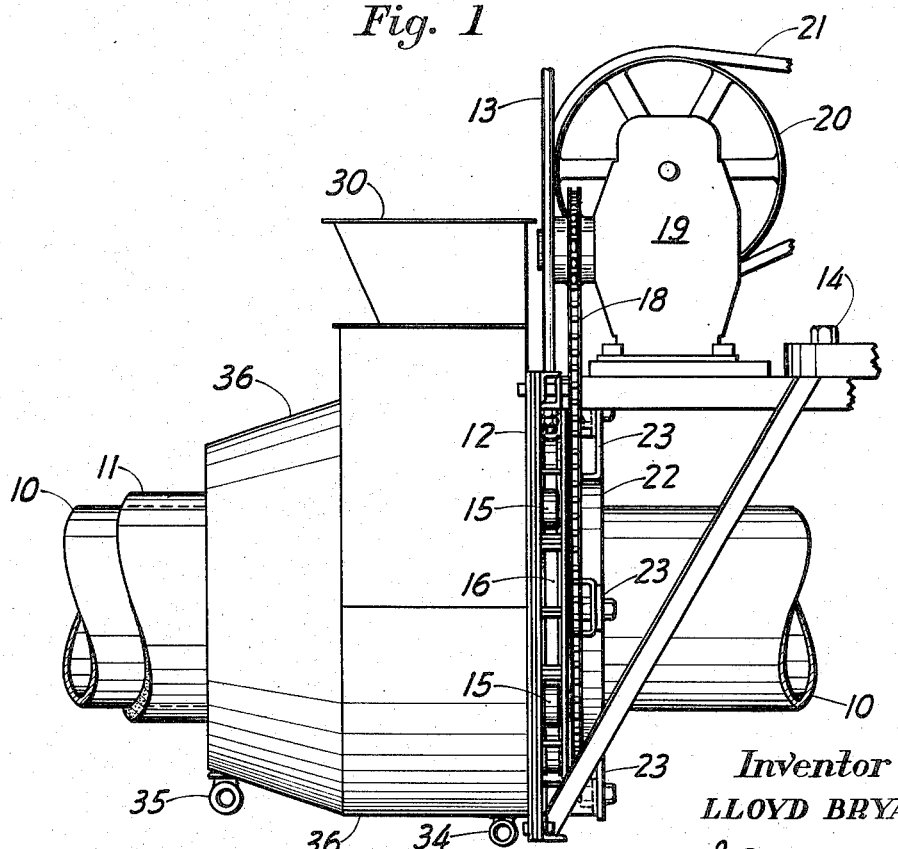
Figure 2 is a side elevation view of the apparatus shown in Figure 1.

Referring to the drawings, reference numeral 10 designates a pipe on which a coating material 11, which may be a bituminous mastic, is to be applied. Pipe 10 may be stationary and the coating equipment moved along it by any suitable means, or the pipe may be in lengths which are successively passed through the stationary coating equipment.

The coating nozzle comprises a frame 12 adapted to surround the pipe 10. If the apparatus is to be stationary and the pipe urged therethrough, frame 12 may be supported by rods 13 from a suitable overhead support, not shown. If the apparatus is to be moved along a stationary pipe, the frame may be coupled as at 14 to any suitable towing apparatus such as that previously mentioned. Frame 12 is generally transverse to the axis of and surrounds pipe 10, and is provided with a number of spaced rollers 15 which support and guide a recessed ring 16. The front or leading face of ring 16 is formed with sprocket teeth 17 and is adapted to be rotated by a roller chain 18, from means such as a variable speed reducer 19, the latter having a pulley 20 driven by belt 21 from any suitable power source. Ring 16 is thus adapted to be rotated in a plane at right angles to the axis of the pipe 10.

Within ring 16 and spaced therefrom is a stationary inner sleeve 22, concentric with the pipe 10 and at a radial distance which will permit couplers, irregularities such as welds, and the like, to pass freely through its bore. Brackets 23 serve to support sleeve 22 from frame 12.

Extending rearwardly from frame 12 is a stationary outer sleeve 24, flanged at 25 to a conical member 26, the latter terminating at its outer end in a gradually tapered bore 27 and a flanged ring 28, the bore of the latter being desirably lined or faced with a hard material to withstand the abrasive effect of the mastic and serving to define the outer diameter of the coating to be applied to the pipe.

A portion of the upper part of outer sleeve 24 is cut away as at 29 to form an opening through which mastic may be supplied from hopper 30. The outer surface of inner sleeve 22 and the inner surface of outer sleeve 24 are preferably provided with circumferentially spaced lands or vanes 31 which extend substantially longitudinally with respect to the axis of the annular mastic passage or chamber formed between the two sleeves. It is also desirable to provide similar lands 31 on the sharply tapered portion of the conical member 26.

Figure 3:
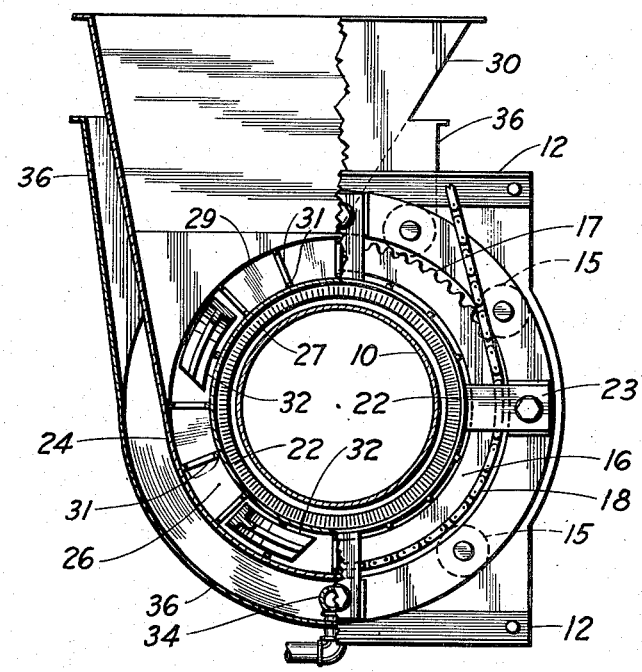
Figure 3 is a vertical and part sectional view on line III—III of Figure 1.
Figure 4:
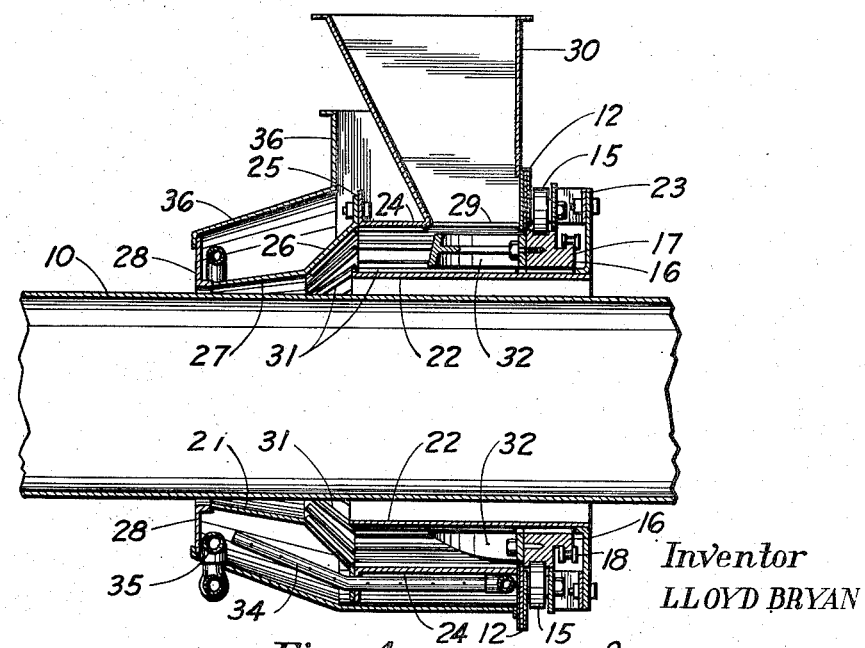
Figure 4 is a vertical sectional view on line IV—IV of Figure 1.

In order to distribute mastic entering the chamber formed between the two sleeves 22 and 24 so that it will be uniformly distributed around the periphery of pipe 10 and also in order to urge the mastic longitudinally through that chamber, a plurality of circumferentially spaced helical blades 32 are secured to the rear or inner face of rotating ring 16 so as to be rotated thereby and carried successively through the annular chamber. Desirably, blades 32 are provided with a stiffening web 33 and extend substantially throughout the length of the annular chamber between the two sleeves 22 and 24. In the arrangement shown the rotation of blades 32 is clockwise and, as shown in Figure 3, hopper 30 preferably is arranged to feed the incoming mastic to those blades which are moving upwardly in the annular chamber. Thus, each blade will receive a portion of the mastic and will advance it into the constricted portion of the nozzle formed by conical member 26, lands 31 tending to direct the mastic longitudinally and prevent it from merely churning or rotating in the chamber with blades 32.

When different sizes of pipes 10 are to be coated, member 26 may be separated from the stationary outer sleeve 24 at the flanged connection 25 and the proper size substituted. Inner sleeve 22 will ordinarily accommodate a large range of pipe sizes as the relative motion between the coating device and the pipe will prevent mastic from being forced ahead and inside of inner sleeve 22.

When a thermoplastic material, such as bituminous mastic, is used with this device, it is desirable to heat portions of the nozzle arrangement, primarily the outer sleeve 24, conical member 26 and flanged ring 28. This softens the binder and permits the mastic to slip easily along these surfaces without adhering to them and greatly assists in the operation of the coating unit. In this example a gas burner 34 is provided beneath outer sleeve 24 and extends rearwardly so as to heat the conical member 26. A concentric ring burner 35 may be provided to heat the flanged outlet ring 28. An outer jacket 36 serves to confine the hot gases from burners 34 and 35 and desirably directs the hot gases upwardly along hopper 30 so that the mastic will not chill and adhere to the inside of that member.

It is believed that the essence of this invention resides in the provision of means forming a circular or annular chamber surrounding the pipe to be coated, this chamber being spaced from the pipe and containing rotatable arms or blades which urge the mastic from the inlet to the outlet of the chamber into a relatively short inwardly tapering concentric nozzle which compresses the mastic onto the pipe to form a dense and waterproof layer and also serves to define the outer diameter of the coating. Desirably, the annular chamber is provided with means, such as the longitudinal lands, which prevent the mastic from rotating within the chamber due to the rotational component induced by the moving blades. The advantages of such a construction are believed to be obvious and include a substantially uninterrupted delivery of mastic into the tapered nozzle section completely around the periphery of the latter, as distinguished from the prior art which introduced the mastic only at one side of such a tapered nozzle. An additional advantage is in the restricted length of contact of such an arrangement with the pipe so that, on crooked pipes or those which are bent to a fairly short radius, the coating will not be distorted by the unyielding length of the nozzle as it passes around the curves or bends in the pipe. Another advantage resides in the self-centering feature of this apparatus due to the force with which the mastic is delivered into the tapered nozzle by the rotating blades, the compressed dense mix tending to align the nozzle to be concentric with the periphery of the pipe.

Although a specific construction of this device has been illustrated and described, it will be appreciated that many modifications and changes may be made in its various parts without departing from the invention, and all such changes that come within the scope of the appended claims are embraced thereby.

I claim:

1. In a device for continuously applying a relatively thick coating of mastic to a pipe or the like, a body having a tapered outlet nozzle to define the outer diameter of said coating and to compact said mastic onto said pipe, a cylindrical outer sleeve communicating with said nozzle, a mastic inlet opening for said sleeve, an inner sleeve concentric with said outer sleeve and spaced from said pipe to be out of contact therewith, said sleeves cooperating to form an annular chamber extending substantially longitudinally with respect to said pipe, a rotatable ring forming one end of said annular chamber, and a plurality of blades secured to the inner face of said ring and adapted to be rotated thereby within said annular chamber to urge said mastic into said tapered nozzle.

2. In a device adapted to be moved relatively to a pipe for continuously applying a thick mastic coating thereto, a stationary cylindrical outer sleeve, a stationary inner sleeve concentric with said outer sleeve and spaced from said pipe to be out of contact therewith, said sleeves cooperating to form an annular pump chamber having an inlet and a discharge end, a plurality of blades extending substantially throughout the length of said chamber and rotatable therein to urge mastic from said inlet toward said discharge end, and a concentric, inwardly tapered nozzle communicating with the discharge end of said chamber to define the outer diameter of said coating on said pipe.

3. A device according to claim 2 in which said blades are disposed substantially helically within said pump chamber.

4. A device according to claim 2 with the addition of substantially longitudinal raised lands on the walls of said pump chamber.

5. A device according to claim 2 with the addition of a rotatable ring forming one end of said chamber, said outer sleeve being provided with a mastic inlet intermediate its ends, said blades being secured to the inner face of said ring to be rotated thereby.

6. In a device adapted to be moved relatively to a pipe for continuously applying a thick mastic coating thereto, stationary means surrounding said pipe and spaced therefrom to be out of contact therewith, said means forming radially separated inner and outer walls of an annular chamber surrounding said pipe, said chamber having a mastic inlet and a mastic outlet, a plurality of circumferentially spaced blades extending substantially throughout said chamber and rotatable therein to urge mastic from said inlet toward said outlet, and a concentric nozzle secured to said stationary means and communicating with the outlet end of said chamber to define the outer diameter of said coating.

LLOYD BRYAN.